US007744099B2

(12) United States Patent
Holbrook

(10) Patent No.: US 7,744,099 B2
(45) Date of Patent: Jun. 29, 2010

(54) METHOD AND SYSTEM FOR ADJUSTING A VEHICLE ALIGNED WITH AN ARTIFICIAL HORIZON

(75) Inventor: Gregory A. Holbrook, Zionsville, IN (US)

(73) Assignee: Driveright Holdings, Ltd., Ballycoolin, Dublin 15 (IE)

( * ) Notice: Subject to any disclaimer, the term of this patent is extended or adjusted under 35 U.S.C. 154(b) by 686 days.

(21) Appl. No.: 11/604,566

(22) Filed: Nov. 27, 2006

(65) Prior Publication Data

US 2007/0120334 A1 May 31, 2007

Related U.S. Application Data

(63) Continuation-in-part of application No. 11/494,935, filed on Jul. 28, 2006, now Pat. No. 7,357,397, which is a continuation of application No. 10/513,734, filed on Nov. 4, 2004, now Pat. No. 7,104,547.

(51) Int. Cl.
*B60S 9/00* (2006.01)

(52) U.S. Cl. ............... 280/6.153; 280/6.154; 280/6.155

(58) Field of Classification Search .............. 280/6.153, 280/6.154, 6.155
See application file for complete search history.

(56) References Cited

U.S. PATENT DOCUMENTS

| 2,956,816 | A | * | 10/1960 | Pribonic | .................. 267/64.19 |
| 3,836,161 | A | | 9/1974 | Buhl | |
| 3,917,307 | A | | 11/1975 | Shoebridge | |
| 4,396,202 | A | | 8/1983 | Kami et al. | |
| 4,630,840 | A | | 12/1986 | Masuda et al. | |
| 4,641,843 | A | | 2/1987 | Morrisroe, Jr. | |
| 4,700,303 | A | | 10/1987 | Tokuyama et al. | |
| 4,709,934 | A | | 12/1987 | Suzuki et al. | |
| 4,712,776 | A | | 12/1987 | Geno et al. | |
| 4,718,650 | A | | 1/1988 | Geno | |
| 4,718,695 | A | | 1/1988 | Kawagoe | |
| 4,733,876 | A | | 3/1988 | Heider et al. | |
| 4,783,089 | A | | 11/1988 | Hamilton et al. | |
| 4,798,369 | A | | 1/1989 | Geno et al. | |
| 4,829,436 | A | | 5/1989 | Kowalik et al. | |

(Continued)

FOREIGN PATENT DOCUMENTS

EP 1084873 3/2001

(Continued)

OTHER PUBLICATIONS

International Preliminary Report on Patentability, EPO, Authorized Officer Robert Jan DeJager, Mar. 10, 2009, 10 pages.

(Continued)

*Primary Examiner*—Eric Culbreth
(74) *Attorney, Agent, or Firm*—Fay Sharpe LLP

(57) ABSTRACT

A method of adjusting a leveled height of the sprung mass of a vehicle that is in approximate alignment with a predetermined datum is disclosed. The method includes approximately aligning the sprung mass with the predetermined datum, receiving an input from an operator for changing the height of the sprung mass and adjusting the height of the sprung mass while maintaining approximate alignment with the predetermined datum. A system for performing the method is also discussed.

19 Claims, 10 Drawing Sheets

U.S. PATENT DOCUMENTS

| | | | |
|---|---|---|---|
| 4,852,861 A | 8/1989 | Harris |
| 4,903,209 A | 2/1990 | Kaneko |
| 4,923,210 A | 5/1990 | Heider et al. |
| 4,939,655 A | 7/1990 | Majeed et al. |
| 4,948,166 A | 8/1990 | Kaneko |
| 4,971,360 A | 11/1990 | Pischke et al. |
| 5,025,877 A | 6/1991 | Assh |
| 5,047,938 A | 9/1991 | Yokote et al. |
| 5,058,017 A | 10/1991 | Adachi et al. |
| 5,071,159 A | 12/1991 | Kamimura et al. |
| 5,083,275 A | 1/1992 | Kawagoe et al. |
| 5,130,927 A | 7/1992 | Kunishima et al. |
| 5,141,245 A | 8/1992 | Kamimura et al. |
| 5,142,897 A | 9/1992 | Pischke et al. |
| 5,161,579 A | 11/1992 | Anderson |
| 5,176,391 A | 1/1993 | Schneider et al. |
| 5,180,024 A | 1/1993 | Eto |
| 5,184,841 A | 2/1993 | Pischke et al. |
| 5,193,063 A | 3/1993 | Assh |
| 5,216,364 A | 6/1993 | Ko et al. |
| 5,220,505 A | 6/1993 | Yokote et al. |
| 5,220,982 A | 6/1993 | Anderson |
| 5,228,704 A | 7/1993 | Tabe |
| 5,229,829 A | 7/1993 | Nihei et al. |
| 5,267,466 A | 12/1993 | Morris |
| 5,287,277 A | 2/1994 | Mine et al. |
| 5,322,321 A | 6/1994 | Yopp |
| 5,344,189 A | 9/1994 | Tanaka et al. |
| 5,373,445 A | 12/1994 | Yopp |
| 5,374,037 A | 12/1994 | Bledsoe |
| 5,430,647 A | 7/1995 | Raad et al. |
| 5,452,919 A | 9/1995 | Hoyle et al. |
| 5,461,564 A | 10/1995 | Collins et al. |
| 5,465,209 A | 11/1995 | Sammut et al. |
| 5,499,845 A | 3/1996 | Geiger et al. |
| 5,517,847 A | 5/1996 | Campbell et al. |
| 5,530,648 A | 6/1996 | Lavey |
| 5,560,591 A | 10/1996 | Trudeau et al. |
| 5,642,043 A | 6/1997 | Ko et al. |
| 5,652,703 A | 7/1997 | Kawazoe |
| 5,696,678 A | 12/1997 | Raad et al. |
| 5,707,045 A | 1/1998 | Easter |
| 5,860,450 A | 1/1999 | Trudeau et al. |
| 5,913,525 A | 6/1999 | Schneider et al. |
| 6,050,573 A | 4/2000 | Kunz |
| 6,098,967 A | 8/2000 | Folchert |
| 6,098,995 A | 8/2000 | Danis |
| 6,098,996 A | 8/2000 | Perlot |
| 6,116,586 A | 9/2000 | Westerkamp et al. |
| 6,173,974 B1 | 1/2001 | Raad et al. |
| 6,176,495 B1 | 1/2001 | Decker |
| 6,224,044 B1 | 5/2001 | Heilenkötter et al. |
| 6,234,493 B1 | 5/2001 | Kleen et al. |
| 6,260,860 B1 | 7/2001 | Brookes et al. |
| 6,264,213 B1 | 7/2001 | Kutscher |
| 6,314,353 B1 | 11/2001 | Ohsaku et al. |
| 6,327,525 B1 | 12/2001 | Pauli et al. |
| 6,332,623 B1 | 12/2001 | Behmenburg et al. |
| 6,356,075 B1 | 3/2002 | Shank |
| 6,369,583 B1 | 4/2002 | Sommer et al. |
| 6,418,363 B2 | 7/2002 | Cochofel et al. |
| 6,428,026 B1 | 8/2002 | Smith |
| 6,431,557 B1 | 8/2002 | Terborn et al. |
| 6,470,248 B2 | 10/2002 | Shank et al. |
| 6,471,196 B2 | 10/2002 | Stiller |
| 6,584,385 B1 | 6/2003 | Ford et al. |
| 6,669,217 B2 | 12/2003 | Sorum et al. |
| 6,684,138 B1 | 1/2004 | Friede et al. |
| 6,948,722 B2 | 9/2005 | Sproatt et al. |
| 2001/0003386 A1 | 6/2001 | Stiller |
| 2001/0005803 A1 | 6/2001 | Cochofel et al. |
| 2001/0017449 A1 | 8/2001 | Stiller |
| 2002/0035423 A1 | 3/2002 | Shank et al. |
| 2002/0079626 A1 | 6/2002 | Grotendorst et al. |
| 2002/0096840 A1 | 7/2002 | Sulzyc et al. |
| 2003/0023357 A1 | 1/2003 | Trudeau et al. |
| 2003/0173750 A1 | 9/2003 | Sorum et al. |
| 2004/0061293 A1 | 4/2004 | Barbison |
| 2005/0161891 A1 | 7/2005 | Trudeau et al. |

FOREIGN PATENT DOCUMENTS

| | | |
|---|---|---|
| EP | 1 380 454 A1 | 1/2004 |
| JP | 59 075816 A | 4/1984 |
| JP | 61 263820 A | 11/1986 |
| JP | 02 144211 A | 6/1990 |
| JP | 03 028010 A | 2/1991 |
| JP | 03 0281010 A | 2/1991 |
| JP | 04 071918 A | 3/1992 |
| WO | WO 94/00307 A | 1/1994 |
| WO | WO 2005/005178 A | 1/2005 |

OTHER PUBLICATIONS

Accelerometer Fundamentals, Document No. AN-00MX-001 from Memsic, Inc., North Andover, Massachusetts.

\* cited by examiner

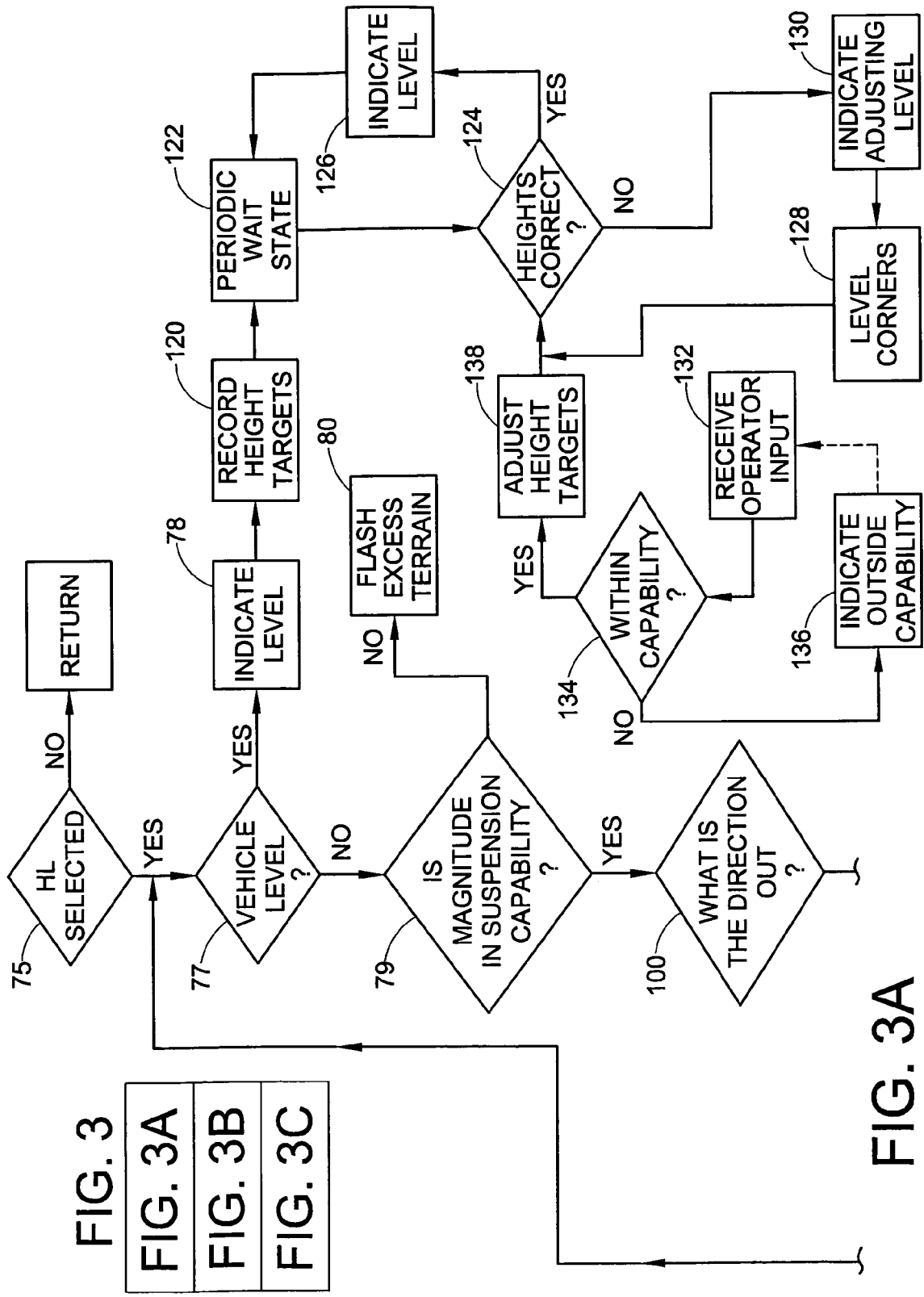

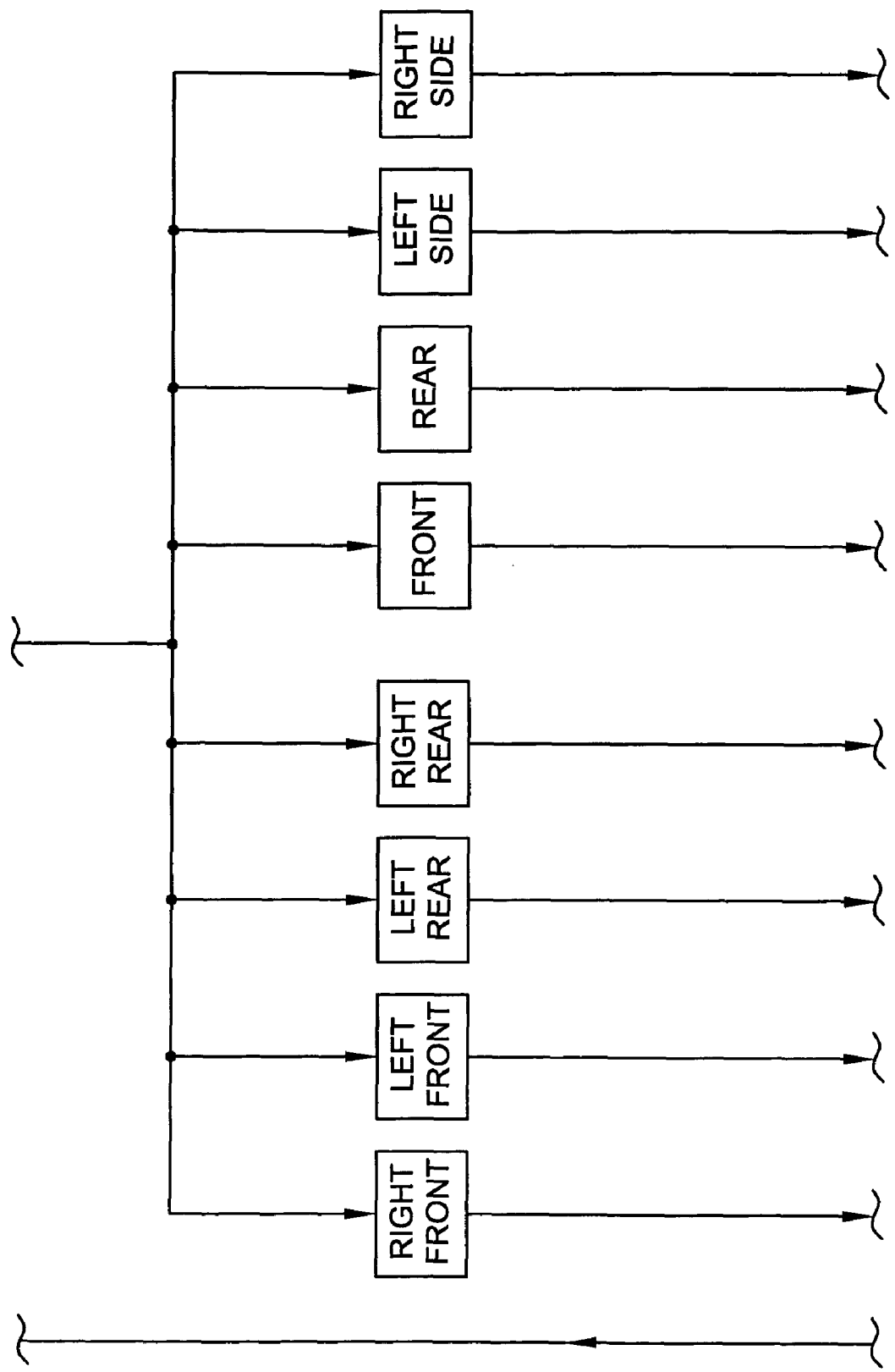

METHOD AND SYSTEM FOR ADJUSTING A VEHICLE ALIGNED WITH AN ARTIFICIAL HORIZON

This application is a continuation-in-part of U.S. patent application No. 11/494,935, filed Jul. 28, 2006, now U.S. Pat. No. 7,357,397, issued on Apr. 15, 2008, which is a continuation of U.S. patent application Ser. No. 10/513,734, filed on Nov. 4, 2004, now U.S. Pat. No. 7,104,547, issued on Sep. 12, 2006, which claims priority from U.S. Provisional Patent Application No. 60/463,487 filed on Apr. 17, 2003, each of which is hereby incorporated herein by reference in its entirety.

BACKGROUND

The present invention broadly relates to air suspension systems and, more particularly, to an electronically controlled air suspension system for use in association with a stationary vehicle that adjusts the air springs of the stationary vehicle to vary the leveled height of the vehicle chassis while maintaining approximate alignment of the vehicle chassis with an artificial horizon or other predetermined datum.

The present invention finds particular application in association with the use of larger mobile vehicles, such as recreational vehicles (RVs), travel trailers and over-the-road truck trailers, for example, and will be described herein with particular reference thereto. However, it is to be understood that such vehicles are simply exemplary structures and that the present invention is capable of broader application in association with the alignment of a wide variety of structures and vehicles. Further examples of such structures and vehicles include gun platforms, military and civilian personnel transport vehicles, and ambulances.

Many larger vehicles, such as RVs, travel trailers, over-the-road truck trailers and the like, have an air suspension system for regulating the height of the vehicle chassis relative to the supporting axles, in a manner that is dependent upon the load placed in the vehicle, to adjust the height of the chassis in response to the ride conditions experienced by the vehicle. These suspension systems usually consist of a plurality of fluid suspension members, such as air springs, which support the vehicle chassis above the axles. The height of the air springs is controlled by the ingress and egress of pressurized fluid from a suitable source mounted on the vehicle, such as a compressor. One or more intervening valves are traditionally used to facilitate the ingress and egress of pressurized fluid respectively into and out of the air springs, thus adjusting the height of the air springs and correspondingly the position of the vehicle chassis relative to the vehicle axles. Such systems also enable the vehicle chassis to be maintained in an orientation substantially aligned with the axles while the vehicle is stationary. This is accomplished by individually regulating the heights of the air springs that support the vehicle chassis on the axles. One disadvantage of such systems, though, is that the chassis can only be positioned relative to the axles. So, if the axles are disposed in an undesirable orientation, the chassis, though level with the axles, will also be disposed in an undesirable orientation.

As an alternative, many of these vehicles, such as RVs, will also use a plurality of hydraulic jacks, which are lowered in order to level the floor of the RV when in a stationary, parked condition. However, in certain situations, the use of hydraulic jacks is not permitted, such as when the RV is parked on an asphalt parking lot since the jacks could damage the asphalt. Thus, leveling of the vehicle cannot be accomplished under these circumstances. Another disadvantage is the cost associated with these systems, as few of the standard components of the vehicle are utilized therein. That is, the hydraulic jacks, the control valves, the hydraulic lines, the electronic control unit, and the user interface, as well as other components, must be installed on the vehicle, over and above all of the standard components that are already installed. Thus, these extra components increase the cost of the vehicle in order to obtain the leveling feature.

Also, some RVs may use the existing suspension air springs to adjust the floor height and to level the floor by the use of mercury switches, or other controls which will raise and lower certain of the air springs to regulate the height of the floor with respect to the vehicle axles until a level condition is reached. Some examples of such fluid actuated leveling systems for trailers, RVs, etc., are shown in U.S. Pat. Nos. 5,228,704, 5,465,209, 5,180,024, 5,499,845, 6,431,557, and 6,428,026. However, it will be appreciated that these systems may be useful in situations where weight distribution changes in a parked or otherwise stationary vehicle. However, these systems remain ineffective for leveling a vehicle chassis when the axles of the vehicle are not themselves in a level orientation.

The above-listed patents disclose numerous leveling and suspension control systems for air springs in vehicles, some of which are operational while the vehicle is moving, while others are actuated when the vehicle is stationary. Most of these systems use the air springs to regulate the height of the vehicle chassis with respect to the axles or the wheel supporting structure in order to achieve a level condition. Also, many of these systems require separate control systems which are in addition to the existing suspension components and pneumatic ride control system of the vehicle.

Another issue that can arise with known leveling and suspension control systems involves the leveled height at which the sprung mass of the vehicle is stationed above the ground. Once a the chassis or body of a vehicle has been leveled, known leveling and suspension control systems are not typically provided with the capability to alter the leveled height of the chassis or body while maintaining the leveled orientation of the same. That is, known systems are normally unable to raise or lower the sprung mass of the vehicle without undesirably altering the leveled condition of the vehicle.

As an example, where the suspension system of an RV has been adjusted such that the sprung mass of the RV is in a leveled condition, it may be desirable to raise or lower the leveled height of the sprung mass of the RV. Such a situation might exist where the folding stairs of the RV will not fully extend because the body of the RV is stationed too low to the ground. Alternately, a situation might exist in which the folding stairs of the RV are spaced too far from the ground even when fully extended. In either case, it may be desirable to raise or lower the body of the RV.

To adjust the height of a leveled body or chassis of a vehicle that is outfitted with a known leveling or suspension control system, such as may be provided on an existing RV, for example, an operator could individually adjust each of the suspension members of the suspension system in an attempt to achieve a leveled condition at the desired or target height. Due to the manual operation of such known systems, however, further adjustment of the suspension system to re-level the body or chassis of the vehicle to a leveled orientation might be required. Unfortunately, this further adjustment may undesirably alter the leveled height from the previously desired or targeted height. As such, adjusting the height of known leveling and suspension control systems can be an iterative process that is challenging and somewhat time consuming.

For at least these reasons, it is considered desirable to develop an air suspension system that overcomes these as well as other disadvantages.

BRIEF DESCRIPTION

A method of adjusting a leveled height of a vehicle is provided in accordance with the present novel concept. The vehicle has a sprung mass supported by a suspension system on an unsprung mass. The suspension system being selectively adjustable using a control system that is operable in a standard leveling mode in which the sprung mass is leveled relative to the unsprung mass and a horizon leveling mode in which the sprung mass is leveled relative to a predetermined datum independent of the relative position of the unsprung mass. The method includes entering the horizon leveling mode, and approximately aligning the sprung mass with the predetermined datum at a first leveled height while in the horizon leveling mode. The method also includes receiving an operator input corresponding to one of increasing the first leveled height and decreasing the first leveled height while in the horizon leveling mode. The method further includes adjusting the sprung mass from the first leveled height to a second leveled height based on the operator input while in the horizon leveling mode.

A method of adjusting a suspension system of a vehicle that has a sprung mass and an unsprung mass is provided in accordance with the present novel concept. The method includes entering an operating mode in which a control system of the suspension system is capable of approximately aligning the sprung mass of a vehicle with a predetermined datum. The method also includes adjusting the sprung mass into an approximately aligned condition with the predetermined datum using the suspension system. The approximately aligned condition occurs at a first leveled height. The method further includes checking for approximate alignment of the sprung mass with the predetermined datum. The method also includes generating and storing initial height target data corresponding to the first leveled height of the sprung mass. The method also includes receiving an operator input corresponding to a desired change in the first leveled height of the sprung mass, and modifying the initial height target data based at least in part on the operator input. The method further includes checking for approximate positioning of the sprung mass at a second leveled height that corresponds to the modified height target data. The method also includes determining that the sprung mass is at a leveled height that is different from the second leveled height which corresponds to the modified height target data, and adjusting the sprung mass into approximate position at the second leveled height using the suspension system while maintaining the sprung mass in approximate alignment with the predetermined datum.

A vehicle suspension system in accordance with the present novel concept is provided that is operatively disposed between an associated sprung mass and an associated unsprung mass of an associated vehicle. The vehicle suspension system is adapted to approximately align the associated sprung mass with a predetermined datum and to adjust a leveled height of the associated sprung mass relative to a ground surface while maintaining the associated sprung mass in approximate alignment with the predetermined datum. The vehicle suspension system includes a plurality of fluid suspension members supported between the associated sprung and unsprung masses. A pressurized fluid source is in fluid communication with the plurality of fluid suspension members, and a control device is fluidically disposed between the pressurized fluid source and the plurality of fluid suspension members. The control device is operative to selectively transfer pressurized fluid between the pressurized fluid source and the plurality of fluid suspension members. An alignment sensor is supported on the associated sprung mass and is operative to output a signal indicative of an orientation of the associated sprung mass. A height sensor is operatively connected between the associated sprung and unsprung masses and is operative to output a signal indicative of a distance therebetween. A control system is in communication with at least the control device, the alignment sensor and the height sensor. The control system includes a memory and a determining device, and is adapted to operate the vehicle suspension system in a standard leveling mode during over-the-road usage of the associated vehicle and in a horizon leveling mode during stationary usage of the associated vehicle. Additionally, the control system is operative to receive a signal from the alignment sensor and selectively activate the control device until the signal from the alignment sensor is indicative of the associated sprung mass being approximately aligned with the predetermined datum. The control system is also operative to receive the signal from the height sensor and store in the memory height target data having a relation to the signal as a target height. The control system is also operative to receive an operator input and modify the height target data based on the operator input. The control system is further operative to adjust the leveled height of the associated sprung mass based on the modified height target data.

The present invention provides an electronic control system for leveling a vehicle chassis, such as the frame, subframe, floor and/or body of an RV or over-the-road trailer, for example, which uses the existing air suspension components for the vehicle ride system, avoiding additional and costly duplicate components and additional space usage in order to provide the desired leveling effect for the vehicle chassis, especially when the vehicle is stationary.

Another feature of the invention is to provide a leveling system that requires only the addition of an alignment sensor or other level detection device, such as an accelerometer, tilt sensor, gyro, or similar type sensor, for example. The alignment sensor is supported on the vehicle chassis and operationally connected with an electronic control unit (ECU), which is used to control the ride suspension system in combination with software for the ECU for performing a method of the present invention.

Still another feature of the invention is to provide a horizon leveling control system that aligns the vehicle chassis with respect to an artificial horizon or other predetermined datum independent of the distance of the vehicle chassis from the axles or wheels, by introducing this artificial horizon or predetermined datum into the software of the ECU.

Another feature of the invention is to provide the system with an interlock via the standard height leveling system to ensure that the ECU automatically disengages the horizon leveling system of the invention and goes to the normal ride height leveling upon movement of the vehicle or placement of the vehicle in a transmission gear in preparation for subsequent movement.

A further aspect of the invention is to enable the system to determine whether the individual air springs have sufficient travel to enable the vehicle to achieve a level condition after the tilt or orientation of the vehicle is initially determined by the system before attempting to perform the actual leveling by introducing or exhausting air into or from selected air springs.

A further feature of the invention is the ability to regulate the heights of the individual air springs in a particular sequence, such as initially adjusting for large magnitudes of unevenness by adjusting the air springs on one side of the vehicle, after which smaller magnitudes of height can be compensated for by individually adjusting either the front or rear air spring on the selected one side of the vehicle.

Still another advantage of the present invention is to enable the system to initially exhaust air from the air springs on a high side or corner of the vehicle after the unevenness is detected by the level detection device, prior to introducing additional pressurized fluid into one or more of the air springs to raise a lower side, thereby reducing the depletion of the supply of pressurized fluid and minimizing additional work by the vehicle compressor.

Still a further feature of the present invention is to provide a vehicle suspension system that is capable of increasing and decreasing the leveled height of the sprung mass of a vehicle. Thus, an operator can selectively raise and lower the chassis or body of a vehicle while maintaining the chassis or body in approximate alignment with the predetermined datum during the leveled height changes.

In summary, the invention provides a horizon leveling system that utilizes most of the features and components of the air suspension ride system of a vehicle, such as an RV, travel trailer or over-the-road trailer, for example, by the addition of a level detection device and by programming the ECU with an artificial horizon or other predetermined datum. The present system is adapted to adjust the orientation of the vehicle chassis into alignment with the artificial horizon irregardless of the position of the vehicle axles.

The foregoing advantages, construction and operation of the present invention will become more readily apparent from the following description and the accompanying drawings.

BRIEF DESCRIPTION OF THE DRAWINGS

Similar numerals refer to similar parts throughout the drawings.

DETAILED DESCRIPTION

It is to be understood that term chassis, as recited herein, generally refers to the sprung mass of the vehicle, which typically includes one or more of the components supported on the fluid suspension members. This can include, but is not limited to, a frame, a subframe, a floor and/or a body of the vehicle, for example. Additionally, the terms level, leveling and the like as used herein, such as in the term "horizon leveling," for example, are not intended to be in any way limited to horizontal or vertical leveling. Rather, such terms refer to substantial alignment with a predetermined datum regardless of the orientation of the predetermined datum.

Figure 1:
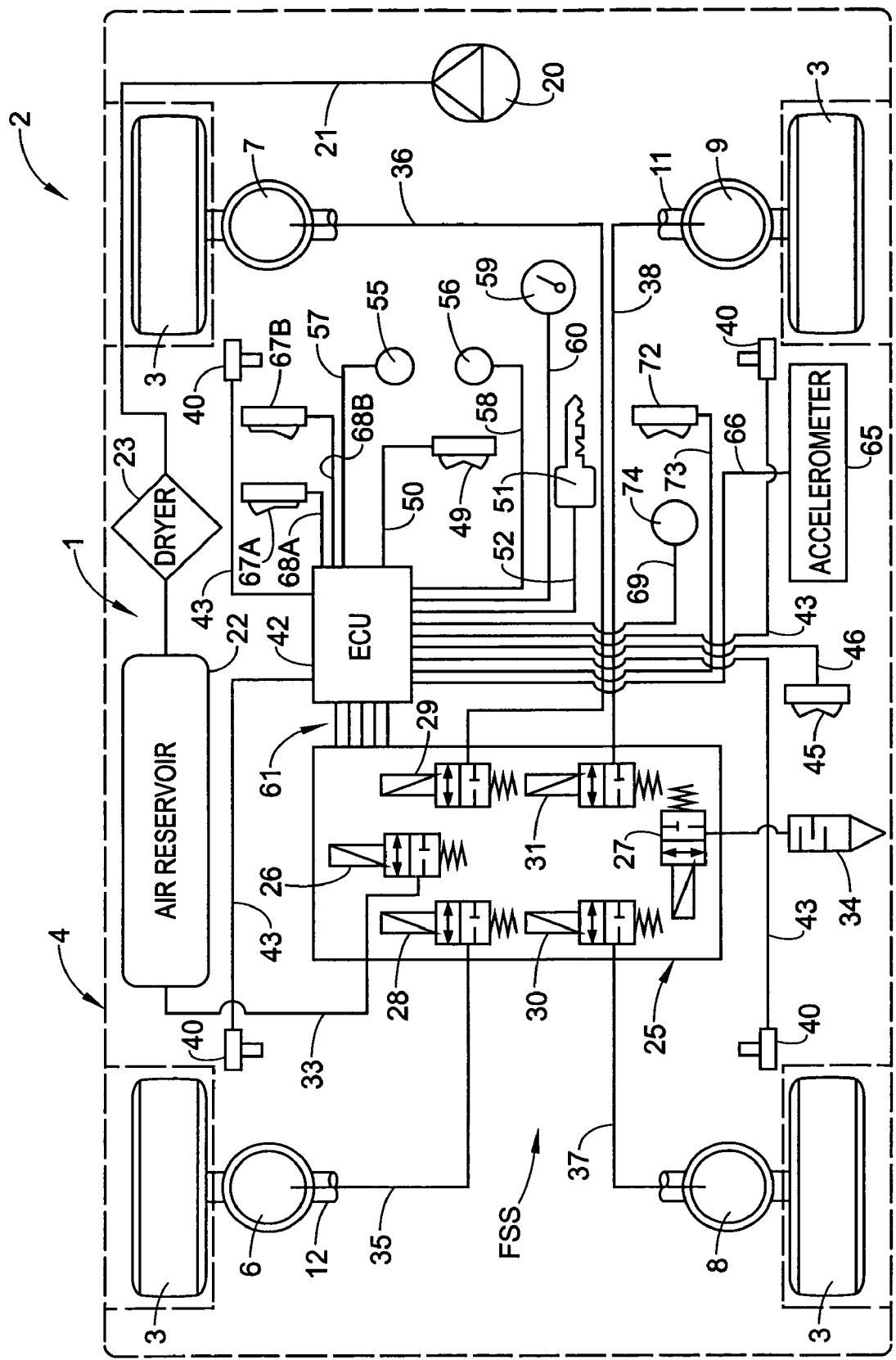
FIG. 1 is a schematic diagram of the horizon leveling system and components thereof mounted on a traditional dual axle vehicle.

FIG. 1 is a diagrammatic representation of the horizon leveling system of the present invention which is indicated generally at 1, and illustrated as being used on a vehicle 2, such as an RV, for example. However, system 1 can be used on other types of vehicles such as travel trailers, over-the-road truck trailers, ambulances, and personnel transport vehicles, for example. The system can also be used on stationary equipment, such as a gun platform, for example, that is supported on fluid suspension members, such as air springs, for example. Vehicle 2 includes a plurality of wheels 3, one of which is illustrated on each corner of the vehicle, and a fluid suspension system FSS. The fluid suspension system includes air springs 6, 7, 8 and 9 mounted adjacent each wheel 3 on the ends of supporting front and rear axles 11 and 12 and supports a vehicle chassis 4 thereon. For smaller vehicles, only a single axle having a pair of air springs may be utilized. However, for most RVs or other large pieces of equipment or vehicles, at least a pair of axles will be utilized having one or more air springs adjacent each end thereof.

The air springs are of a usual construction having a pair of spaced end members 15 and 16 (FIGS. 5 and 6) with an intervening flexible sleeve 17 forming an internal fluid chamber. Some examples of known air springs are shown in U.S. Pat. Nos. 5,374,037, 4,852,861, and 4,718,650, which are incorporated herein by reference. Air-over-damper type suspension members also can be used within the scope of the present invention, such as is shown in U.S. Pat. No. 4,712,776 and which is incorporated herein by reference.

Leveling system 1 includes a compressor 20, which can be electrically operated or driven by the engine of the vehicle or in another suitable manner, to supply pressurized fluid, usually air, through a supply line 21 to a reservoir or supply tank 22. It will be appreciated that such compressors are known to be operable independent of the engine of the vehicle. A dryer 23 can optionally be included and is preferably fluidically interconnected along line 21 for removing moisture from the pressurized fluid prior to entering reservoir 22. If desired, pressurized fluid can be supplied directly to the air springs from the compressor without first going to reservoir 22.

A main control valve assembly 25 includes an inlet valve 26, an exhaust valve 27 and individual air spring control valves 28, 29, 30 and 31. Inlet valve 26 is in fluid communication with reservoir 22 through fluid supply line 33 and exhaust valve 27 is in fluid communication with an exhaust silencer 34. -Individual control valves 28, 29, 30 and 31 are connected in fluid communication with individual air springs 6, 7, 8 and 9, respectively, by fluid lines 35, 36, 37 and 38, respectively. It is to be distinctly understood that valve assembly 25 described above and illustrated in FIG. 1 is merely one example of a suitable valve assembly and that any other suitable arrangement can be used without departing from the principles of the present invention. For example, multi-position valves, such as 2-way or 3-way valves for example, could be used in place of one or more of the control valves shown and described.

Each of the air springs have a height sensor or detector, indicated generally at 40, associated therewith that can be any one of various known constructions. Height sensors 40 could utilize the Hall effect, sonics, electromagnetic wave, infrared, resistance, or the like, that operate on, in or merely in association with the air springs and of which all are well known in the air spring art. Some examples of such air spring height detectors that are part of an air spring itself are shown in U.S. Pat. Nos. 5,707,045, 5,229,829, and 4,798,369, which are incorporated herein by reference.

Figure 6:
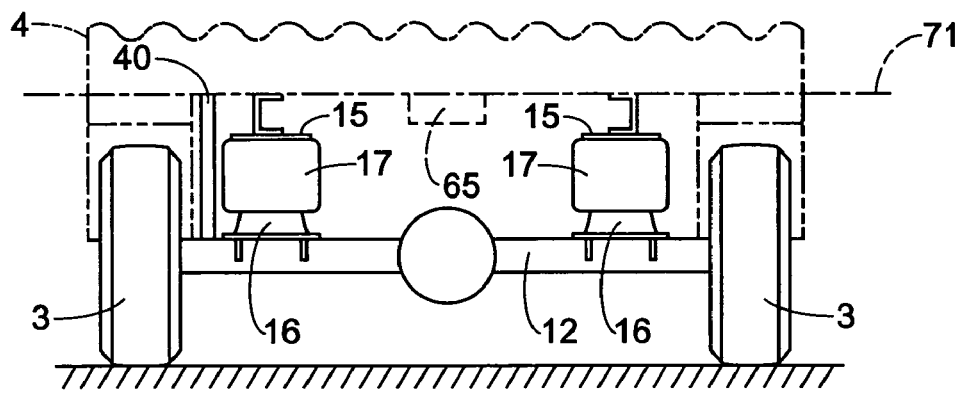
FIG. 6 is an enlarged fragmentary sectional view taken on line 6-6 in FIG. 5.

As shown in FIG. 6, however, height sensor 40 can be a separate component externally supported on the vehicle and extending between spaced-apart portions of the vehicle, such as between the axle and chassis or vehicle body, for example. Each height sensor 40 is preferably supported adjacent one of the individual air springs and is also in communication with an electronic control unit (ECU) 42, such as by a control line 43. Additionally, an end-of-travel signal can be output by the height sensors indicating that one of the extreme positions, such as fully extended or fully compressed, for example, of the associated air spring has been reached or is being approached. Alternately, end-of-travel data can be determined by the ECU based upon a comparison of the signal from the height detector with known end-of-travel values stored within the ECU. ECU 42 preferably includes a standard microchip that can be programmed by one skilled in the art to provide features, such as those discussed hereinbelow and shown in the various drawing figures.

ECU 42 is shown in FIG. 1 as being connected to an optional service switch 45 by control line 46 for selectively actuating the hydraulic jacks that are optionally provided on many RVs. Optionally, the switch can also include ON and/or OFF positions (FIG. 8) for the automatic leveling system used during operation of the vehicle. ECU 42 is also connected to a height switch 49 by a control line 50, to a key actuated vehicle ignition switch 51 by a control line 52, and to a pair of indicating lights 55 and 56 by control lines 57 and 58, respectively. Height switch 49 could alternately be a multi-position switch that is suitable for controlling the automatic leveling system as well as for adjusting or otherwise setting the height of the sprung mass of the vehicle during automatic leveling operation. That is, operations in which the sprung mass is leveled relative to the unsprung mass of the vehicle during dynamic operation thereof.

ECU 42 also is operatively connected to the vehicle speed indicator or speedometer 59 by a control line 60, and to the individual air spring control valves in valve control unit 25 by a plurality of control lines, indicated collectively at 61. As such, ECU 42 is adapted to selectively actuate one or more of the plurality of valves. It will be appreciated that any suitable speed or movement indicating device can be operatively connected to the ECU in addition to or as an alternative to speedometer 59.

ECU 42 is also connected to a horizon leveling switch 72 in a suitable manner, such as through a control line 73, for example. As will be discussed in greater detail below, horizon leveling switch 72 is operable to activate and de-activate a horizon leveling system in which the sprung mass of the vehicle is leveled relative to a pre-determined datum rather than to the unsprung mass of the vehicle. ECU 42 can also be connected to leveled height adjustment switches 67A and 67B in a suitable manner, such as by way of respective control lines 68A and 68B, for example. As will be discussed in greater detail below, leveled height adjustment switches 67A and 67B permit an operator to selectively increase or decrease, respectively, the height of the sprung mass of the vehicle after the same has been leveled to a predetermined datum and while maintaining the sprung mass in an approximately leveled condition while the height adjustment is performed. An indication light 74 is also connected to the ECU in a suitable manner, such as through a control line 69, for example. As an alternate arrangement, horizon leveling switch 72 could be a multi-position switch that is suitable for controlling the horizon leveling system as well as for adjusting the leveled height of the sprung mass of the vehicle. It will be appreciated, however, that any other suitable control device or devices could alternately be used.

It will be appreciated that the control devices discussed above can be of any suitable type, kind and/or construction. Additionally, it will be appreciated that communications to and from the various devices and components of the vehicle, such as height sensors 40, ECU 42, height switch 49, speedometer 59, horizon leveling switch 72 and leveled height adjustment switches 67A and 67B, for example, can be transmitted in any suitable manner. For example, each of the devices and components can be hard-wired to one another as prescribed by each of the various systems operative on the vehicle, with the signals communicated between the devices and components along the individual wires. As an example, if five different systems of the vehicle rely upon a signal from the speedometer, five different wires may be interconnected to the speedometer to provide the signal output by the speedometer to each of the systems directly.

However, many vehicles now include a CAN bus communication system that networks the various devices and components together. Such CAN bus communications systems are well known and commonly used. These systems can include a standalone controller or alternately be integrated into another controller of the vehicle, such as ECU 42, for example. One example of a suitable standard or protocol for such systems is SAE J1939. Though, it will be appreciated that a variety of other protocols exist and could alternately be used, such as CANOpen and DeviceNET, for example.

One advantage of using a CAN bus communication system is that the actual physical wiring of the vehicle is greatly simplified. Another advantage is that the addition of a new device and/or system can be accomplished without significant physical modification of the vehicle. For example, the new system can be added to the vehicle simply by suitably mounting a new device on the vehicle, placing the device into communication with the CAN bus communication system, and making any attendant software and/or firmware modifications to the existing devices and/or components. Once installed, the new system can send and receive any other signals, information and/or data through the CAN bus communication system to operate the newly added system.

Figure 5:
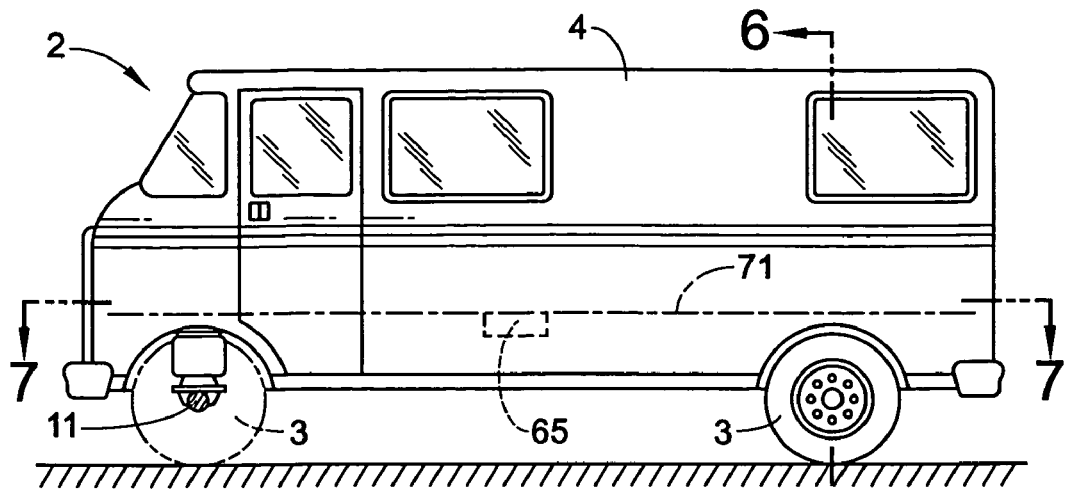
FIG. 5 is a diagrammatic side view of a vehicle to be aligned by the method and system of the present invention.
Figure 7:
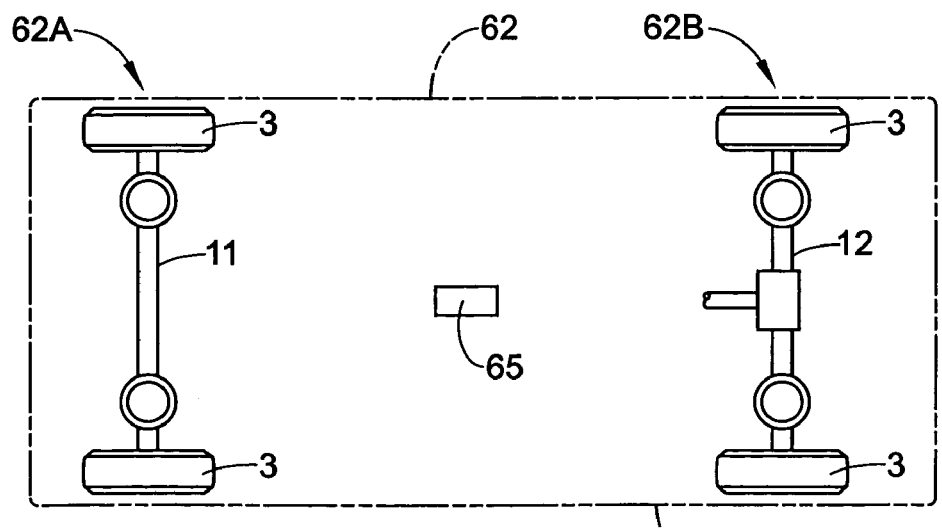
FIG. 7 is a diagrammatic view looking in the direction of line 7-7 in FIG. 5.

In accordance with the invention, an alignment sensor or level detection device, which is indicated generally at 65 and shown diagrammatically in FIGS. 5-7, is mounted on or operatively connected to vehicle chassis 4. Device 65 provides an alignment signal to ECU 42 through a control line 66. The alignment signal is indicative of the orientation of the vehicle chassis. Level detection device 65 can be of any suitable type of apparatus, such as an accelerometer, tilt sensor, gyroscopic sensor, and a transducer or other device that can detect the position, orientation or amount of tilt of a structural body and provide a signal, such as a relative voltage or current, as to the approximate position, orientation or amount of tilt of the structural body associated therewith. One particular type of level detection device is a dual-axis accelerometer manufactured by Memsic, Inc. of North Andover, Mass., identified as model MXR299ML. This sensor operates on a thermal principle, generating a signal, such as an output voltage, for example, for both the X-axis and Y-axis that varies according to the angular orientation of the sensor. Accelerometer 65 provides an analog or digital value or signal that is dependent upon the tilt or out of level of the vehicle chassis upon which the sensor is supported. This signal is supplied to ECU 42 through line 66. Accelerometer 65 can be attached to any part of the vehicle chassis without effecting the invention. For example, the accelerometer could be secured to a portion of a frame, such as a cross beam, or to a portion of the body, such as a roof, side wall or floor. Additionally, the accelerometer can optionally be mounted centrally on the vehicle chassis. However, central mounting is not required.

Thus, in accordance with one of the features of the invention, a typical air suspension system for a vehicle as described above, is utilized without material modifications thereto with the exception of incorporating an alignment sensor or level detection device 65 that is operationally connected to ECU 42, in combination with the appropriate software utilized by ECU 42, to provide the features set forth in the drawing figures and discussed below.

Figure 8:
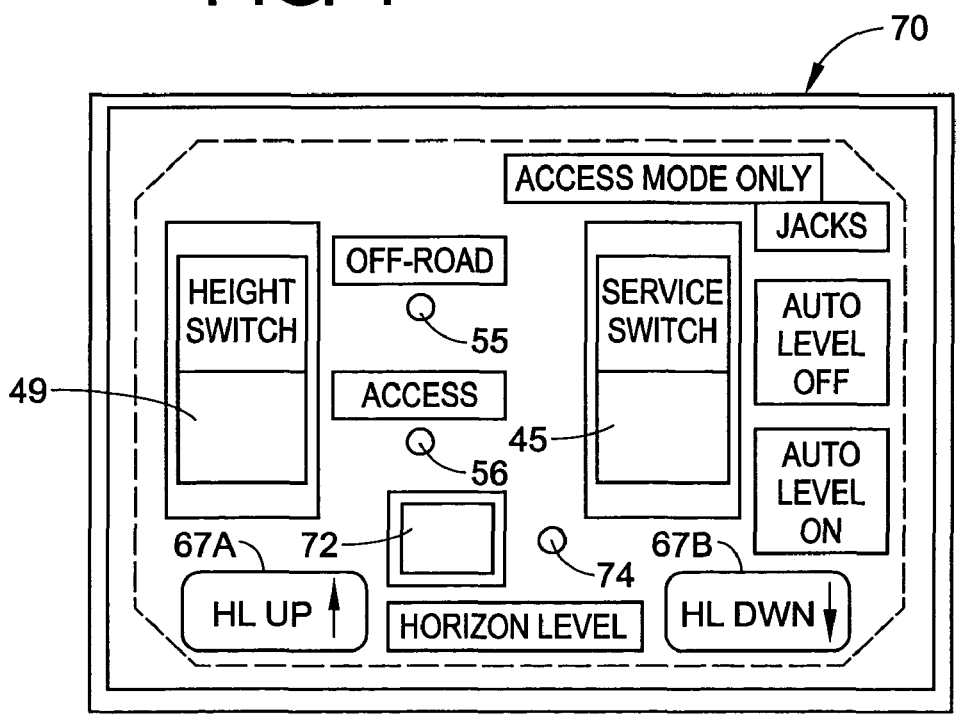
FIG. 8 is a diagrammatic plan view of the suspension system and control panel located within the vehicle.

FIG. 8 represents one exemplary embodiment of a type of control panel 70 that can be located on the dashboard of a vehicle for controlling both the ride suspension system for the vehicle during the dynamic operation thereof as well as the horizon leveling system of the present invention. Panel 70 includes height switch 49 that controls the standard ride leveling system for the vehicle. Panel 70 also includes indicating lights 55 and 56, service switch 45, leveled height switches 67A and 67B, horizon leveling switch 72, and indication light 74. Service switch 45 can be moved to one of three positions as shown in FIG. 8. Additionally, horizon leveling switch 72 could alternately be a multi-position switch that is capable of performing one or more other actions, such as those performed by leveled height switches 67A and 67B, for example. In which case, leveled height switches 67A and 67B could be omitted. Additionally, the switch positions can optionally be illuminated by back lighting to indicate the selected position. If desired, panel 70 could be a touch panel or touch screen which could eliminate the toggle or rocker switches and lights discussed above.

In accordance with one of the features of the invention, an artificial level position or horizon is indicated schematically by dot-dash line 71 (FIGS. 5 and 6). This artificial horizon is programmed into ECU 42 as the predetermined datum. The predetermined datum is an imaginary reference plane that the system uses to align the vehicle chassis irrespective of the orientation of the axles, wheels of the vehicle or the supporting ground. Though line 71 shown in FIGS. 5 and 6 as being substantially horizontal, it will be appreciated that line 71 could be disposed in any desired orientation as established hereinbefore.

Figure 2A:
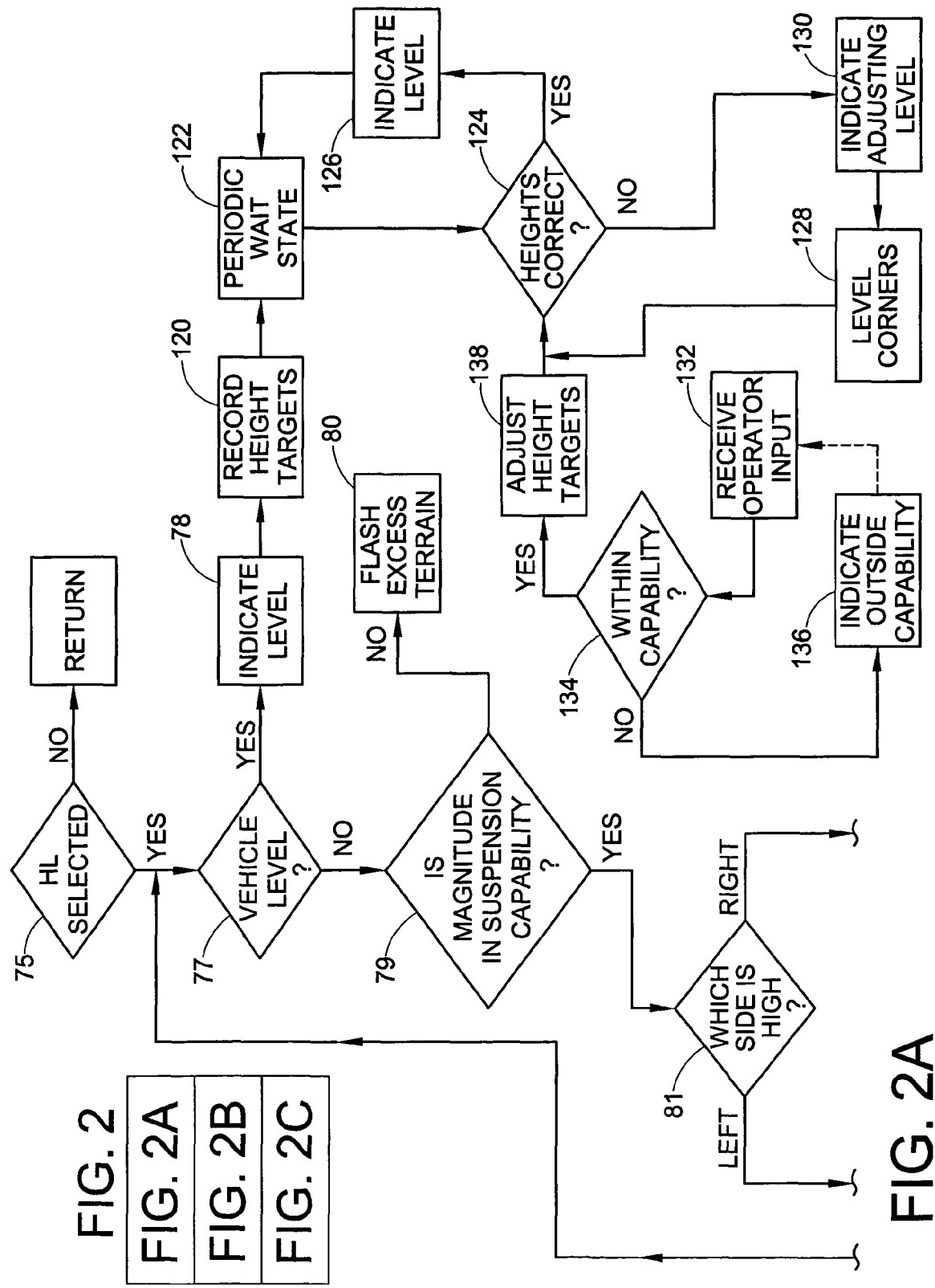
FIG. 2, which includes subfigures 2A, 2B, and 2C, is a flow diagram of one method of the present invention for carrying out the alignment and leveled height changes of a vehicle chassis.

Steps for carrying out one embodiment of the present invention are illustrated in FIG. 2, with a second embodiment being illustrated in FIG. 3, by the flow charts contained therein. Referring to FIG. 2, the vehicle operator, after the vehicle comes to a stop in an area such as a parking lot, campground, or the like, will actuate the horizon leveling system by actuating control switch 72 located on panel 70 in the cab portion of the vehicle, as indicated by block 75 (FIG. 2A). In one preferred arrangement, this is done by depressing and holding control switch 72 for a predetermined period of time. A similar button hold can also be used to disengage the system. Thus, the opportunity for inadvertently initiating (or alternately, disengaging) the system, such as by bumping the switch, for example, is minimized. One example of a suitable duration for holding the switch in the depressed position is from about 3 to about 10 seconds and preferably about 4 seconds.

ECU 42 initially determines whether the vehicle chassis is aligned with the predetermined datum at block 77 by comparing the signals received from accelerometer 65 with respect to the artificial horizon 71 preset in ECU 42. If the ECU senses that the vehicle chassis is out of alignment with the predetermined datum, it will then determine if the magnitude that the vehicle chassis is out of alignment is within the capability of the system to correct at block 79. If outside the capability of the system, it will send a signal to the operator, such as an audible tone or flashing of light 74, as shown by block 80, which immediately advises the driver that the vehicle is excessively uneven and that the suspension system will not be able to sufficiently compensate for the uneven terrain on which the vehicle is currently parked. The driver can then reposition the vehicle at that location or go to a different, more level location. If the out-of-level signal generated by accelerometer 65 is within the capability of the system to correct, the ECU will then proceed to block 81 where it will detect which side of the vehicle is above artificial horizon 71, that is, right side 62 or left side 63, as shown in FIG. 7.

Figure 9:
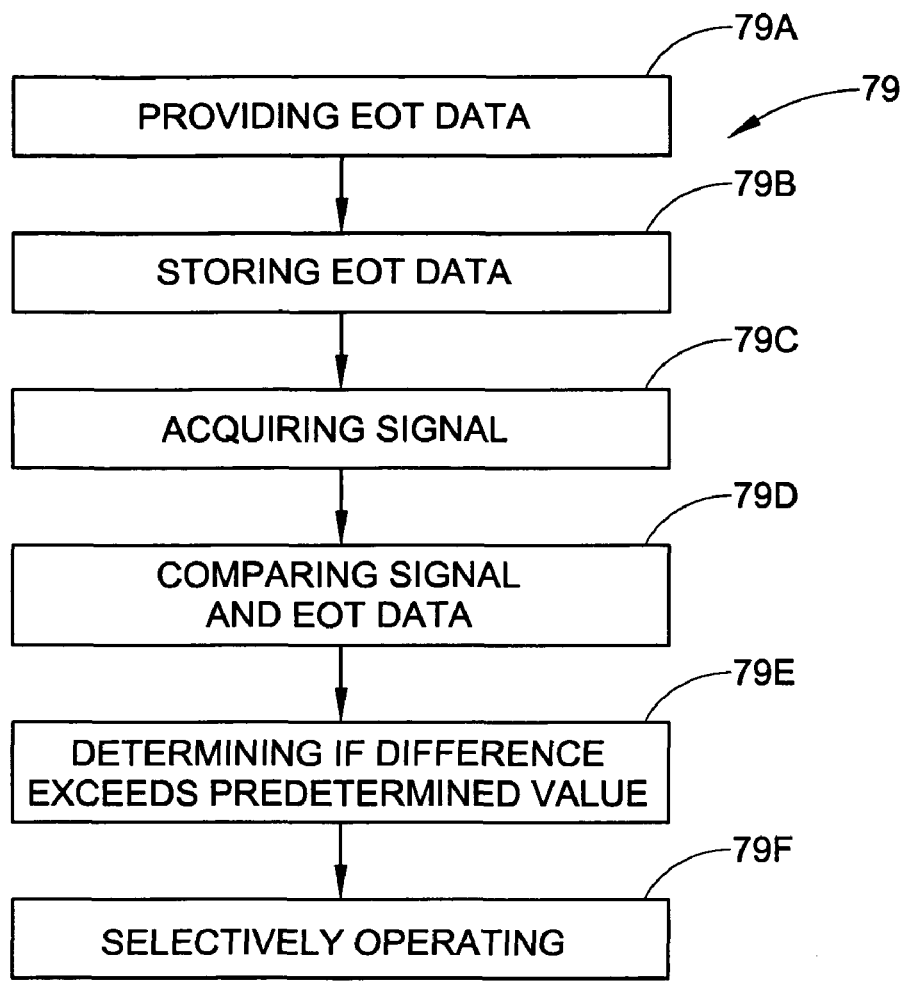
FIG. 9 is a flow diagram of one exemplary method of determining if an adjustment is within the capability of a suspension system.

One example of performing block 79 is shown in FIG. 9 and includes a block 79A of providing end-of-travel data, such as from a height sensor, for example, indicative of one of the extreme positions of an air spring. Block 79 can also include a block 79B of storing the end-of-travel data in an ECU, for example. Block 79 can further include a block 79C of acquiring a signal indicative of the orientation of the vehicle chassis, such as from a height detector or an alignment sensor, for example. Block 79 can include still a further block 79D of comparing the signal indicative of orientation to the stored end-of-travel data. Still a further block 79E of determining if any difference between the signal and the end-of-travel data exceeds a predetermined value can be included in performing block 79. Another block 79F of selectively operating the control device to discontinue pressurized fluid flow if the predetermined value is exceeded can also be included in block 79.

Upon determining at block 81 which is the high side of the vehicle, a determination then is made at block 82 as to whether the amount of unevenness is within the capability of the suspension system to correct by lowering the high side. If a YES determination is made that the right side can be lowered sufficiently at block 82 (assuming for the purpose of this description that the right side was determined to be the high side), a signal is then sent via block 83 to block 84 (FIG. 2C) to determine if the front 62A or the rear 62B of right side 62 is out of alignment. After the determination is made at block 84 that the front or rear is out of alignment, block 85 determines whether it can be lowered sufficiently to correct for the detected unevenness, and if permissible, block 86 provides the signal to lower the appropriate air spring by exhausting air therefrom, such as from air spring 6 since this is the air spring on the rear right side of the vehicle chassis.

If the right side 62 cannot be lowered sufficiently, block 88 (FIG. 2B) determines if the opposite side 63 can be raised sufficiently to compensate for the unevenness. If not, block 89 determines that excess terrain has been encountered and that the system is unable to achieve the desired alignment. Block 91 is then reached which illuminates or flashes indicating light 74 alerting the driver to the condition. If left side 63 can be raised sufficiently to achieve the desired alignment, it is then determined at block 84 whether, as discussed above, the front or rear of the left side is out of alignment, and whether it can be lowered to reach the desired aligned position. If it is determined at block 85 that the front or rear cannot be lowered, a determination is made at block 88 (FIG. 2C) as to whether the opposite front or rear can be raised. If not, block 89 determines that excess terrain has been encountered and that the system is unable to achieve the desired alignment. Block 91 is then reached which illuminates or flashes indicating light 74 alerting the driver to the condition.

It is understood that if left side 63 of the vehicle is determined by block 81 to be the high side, the same procedure is performed as discussed above for the right side. Also, if the front end is determined to be out of level at block 84, the same procedure is performed for the front end as discussed above for the rear end. It is preferred that the air spring or springs on the high side or end be lowered before the air spring or springs on the lower side or end be raised since this involves only exhausting air from the individual air spring which will not deplete the supply of pressure air in reservoir 22. However, if necessary, the appropriate air spring can be raised by supplying it with additional pressurized fluid from reservoir 22. This feature avoids prematurely using the supply of pressurized fluid from reservoir 22.

After alignment with the pre-determined datum has been achieved, such as by lowering high corners of the vehicle (e.g., blocks 83 and 86), raising low corners of the vehicle (e.g., blocks 90) or some combination thereof, for example, the system is returned to block 77. A YES determination is then reached at block 77, and an appropriate signal is sent to light 74 via block 78 (FIG. 2A) to indicate to the driver or operator that a leveled condition has been achieved.

Signals from one or more of height sensors 40 are then received by ECU 42 and data corresponding thereto is stored, such as in a suitable memory within the ECU, for example, as initial height targets corresponding to the initial height of the sprung mass of the vehicle. This action is indicated at block 120. In one preferred embodiment, a signal from a height sensor adjacent each corner of the vehicle is received and data corresponding thereto is stored as height targets for each corner of the vehicle. However, it will be appreciated that any suitable arrangement or operation could alternately be used.

ECU 42 preferably includes a suitable timer or timing circuit (not shown) that operates, as represented by block 122, to indicate when a pre-determined duration or preset time period, such as 30 minutes, one hour, two hours, etc., has passed. The system then rechecks the height of the vehicle chassis or body with the initial height targets, as indicated in decision block 124. This determination can be performed in any suitable manner. For example, ECU 42 could receive or otherwise obtain updated signals from height sensors 40 and compare the updated data corresponding thereto with the initial height targets. If the updated height of the sprung mass is approximately the same as the initial height, such as by being within a predetermined range therefrom, for example, a YES determination is made at decision block 124. The system will then indicate to the user or operator that the vehicle is level or otherwise properly aligned, as indicated by block 126, and will reinitiate the timer or timing circuit, as indicated by block 122, for continued operation in the horizon leveling mode.

If, however, the updated height of the sprung mass is not approximately the same as the initial height, such as by being outside a predetermined range therefrom, for example, a NO determination is made at decision block 124. The system will then proceed to initiate an action adjusting one or more corners of the vehicle to level or otherwise align the sprung mass with the pre-determined datum at the previous height targets, as indicated by block 128. Optionally, the system can indicated to the driver or operator that the suspension system is being adjusted, such as by illuminating light 74 in a suitable manner, for example. Such an action is indicated by block 130. Once a corner leveling action at block 128 is completed, the system returns to decision block 124 to check the height of the sprung mass relative to the initial height targets. If a deviation remains, the process is repeated until the vehicle chassis or body has been returned to the initial height. Thus, this portion of the process may be repeated several times.

Another feature of the system permits a driver or operator to raise and lower the chassis or body of the vehicle once the same has been leveled or otherwise aligned with the pre-determined datum. Thus, the height of the vehicle chassis or body can be increased or decreased by an operator, such as to provide for extra extension of a folding stairway or to position the same a closer distance to the ground surface, for example. Preferably, such an action is performed while maintaining the vehicle chassis or body in approximately the same leveled or aligned orientation.

To raise or lower the sprung mass of the vehicle while in a horizon leveling mode, a driver or operator inputs a signal to increase or decrease the height of the sprung mass. Such an input can be generated in any suitable manner. For example, the operator could depress one of leveled height adjustment switches 67A or 67B. The system or a component thereof, such as ECU 42, for example, receives the operator input, as indicated in block 132. A determination can then be made at decision block 134 as to whether the suspension system has the capability to implement the requested height change. This can be performed in any suitable manner. For example, the operator input can correspond to or otherwise be assigned a discrete value or amount to increase or decrease the vehicle height. The initial or previously stored height targets could then be retrieved from memory and increased or decreased by this discrete value. A determination can then be made by the ECU as to whether the requested height change can be accomplished, such as by comparing the target heights for each corner with stored end-of-travel data corresponding to the respective corners, for example. If it is determined that the requested height change is outside the capability of the suspension system of the vehicle, a NO determination is made at decision block 134. The system can then optionally proceed to block 136 at which an indication can be provided to the operator that the proposed height change is outside the capability of the suspension system. This can be performed in any suitable manner, such as by flashing or otherwise illuminating light 74 using a suitable pattern, for example. Alternately, the system could simply take no action. In either case, the operator could then optionally input a different (e.g., greater or lesser) value for the desired adjustment, and the process will be repeated.

If it is determined that the requested height change is within the capability of the suspension system of the vehicle, a YES determination is made at decision block 134. Block 138 is then reached, at which the initial or previous target heights are adjusted based on the input or inputs received from the operator in block 132. The system then proceeds to check if the vehicle height is correct relative to the adjusted height targets at decision block 124. Because the height target values will have just been modified, a NO determination will normally be reached at decision block 124 and the leveled height changing action will be performed. Once the adjusted target height has been reached, a YES determination will be returned at decision block 124 and the system will proceed as discussed above.

It will be appreciated that the leveled height adjustments discussed herein can be accomplished in any manner suitable for maintaining the vehicle body or chassis in approximate alignment with the predetermined datum. For example, to raise or lower the sprung mass of a vehicle a desired amount, each of the fluid suspension members could be approximately simultaneously vented or filled by the same amount to effect the height change. Preferably, however, each of the fluid suspension members are separately inflated or deflated by the desired amount. In one exemplary embodiment, the fluid suspension members will be selected to be filled or vented in an order that approximately corresponds to the amount of travel in the direction of desired movement. In this preferred embodiment, the fluid suspension member with the greatest amount of travel will be adjusted first, followed by the fluid suspension member with the next greatest amount of travel, and so on. Regardless of the adjustment manner that is used, it is desirable to adjust the fluid suspension members in increments that are sufficiently small that the approximate alignment of the sprung mass of the vehicle can be maintained. For example, according to one exemplary embodiment, the suspension system is incrementally adjusted to maintain the sprung mass in approximate alignment with the predetermined datum.

One advantage of the present system and method is that the ECU initially determines, depending upon the reading received from level indicating device 65, whether the amount of unevenness is too great to be compensated for by the system and to initially alert the operator to relocate the vehicle. This avoids the need to attempt the alignment of the vehicle body by actuation of the appropriate air springs only then to find out that the vehicle body cannot be aligned due to the excessive unevenness of the terrain. This saves time and unnecessary manipulation of the air spring components, fluid supplies, etc. Also, the system determines which side of the vehicle is the high side and then whether it can be compensated and, again, whether this unevenness can be compensated for and then which corner or end of the high side can be lowered to bring the vehicle body into alignment with the artificial horizon or predetermined datum stored in ECU 42.

Again, air is preferably exhausted from the high side air springs or just a corner air spring rather than introduce air into the lower air springs to achieve the desired level to conserve the stored pressurized fluid. Also, it is preferred to lower the vehicle chassis, sides, or corners to achieve the desired levelness as opposed to raising one side or corner thereof to achieve the desired levelness, since a lower vehicle chassis, when stationary, facilitates the ingress and egress of the occupants into and out of the vehicle chassis. Thus, if the vehicle chassis was initially raised to achieve the levelness, it would make the ingress and egress slightly more difficult.

Figure 2B:
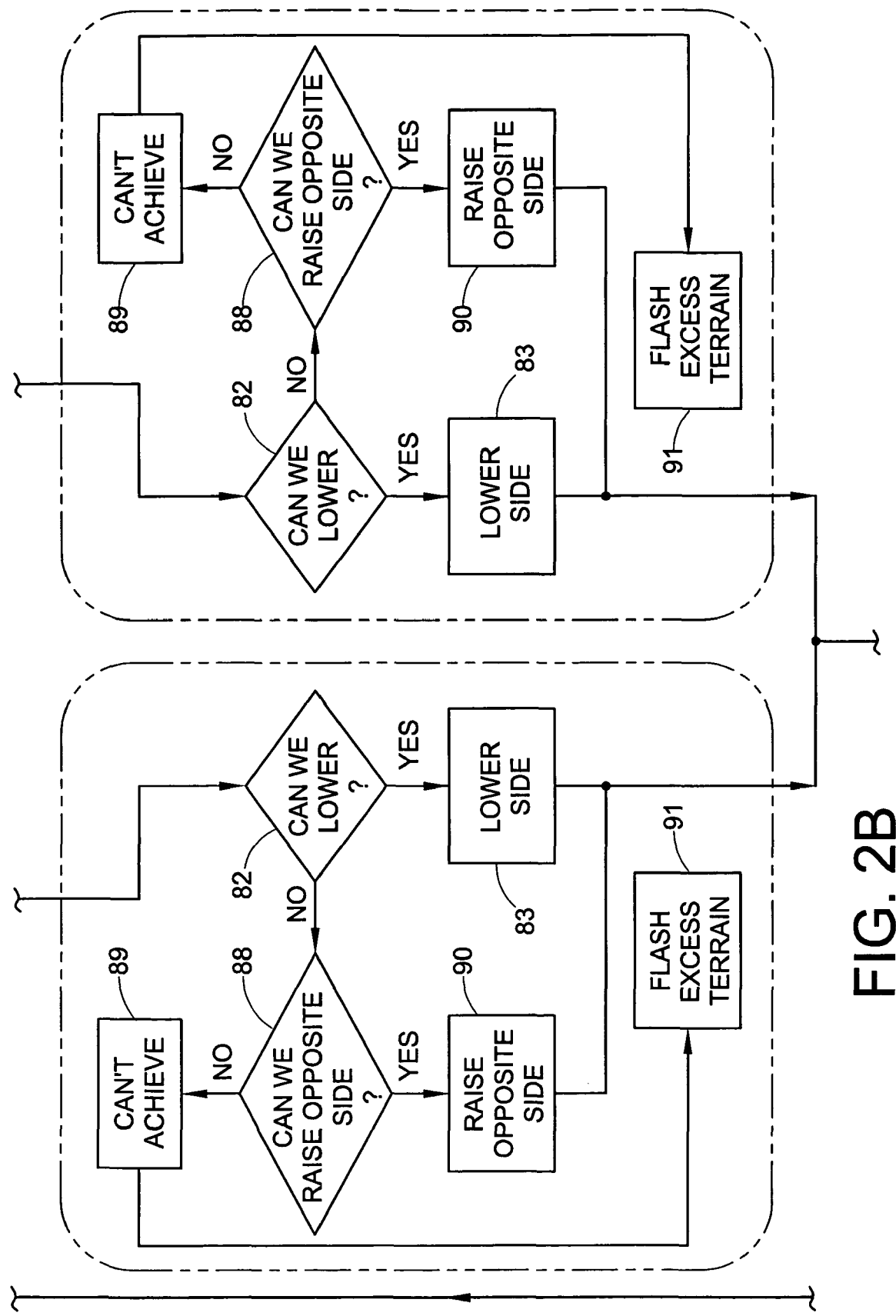
Figure 2C:
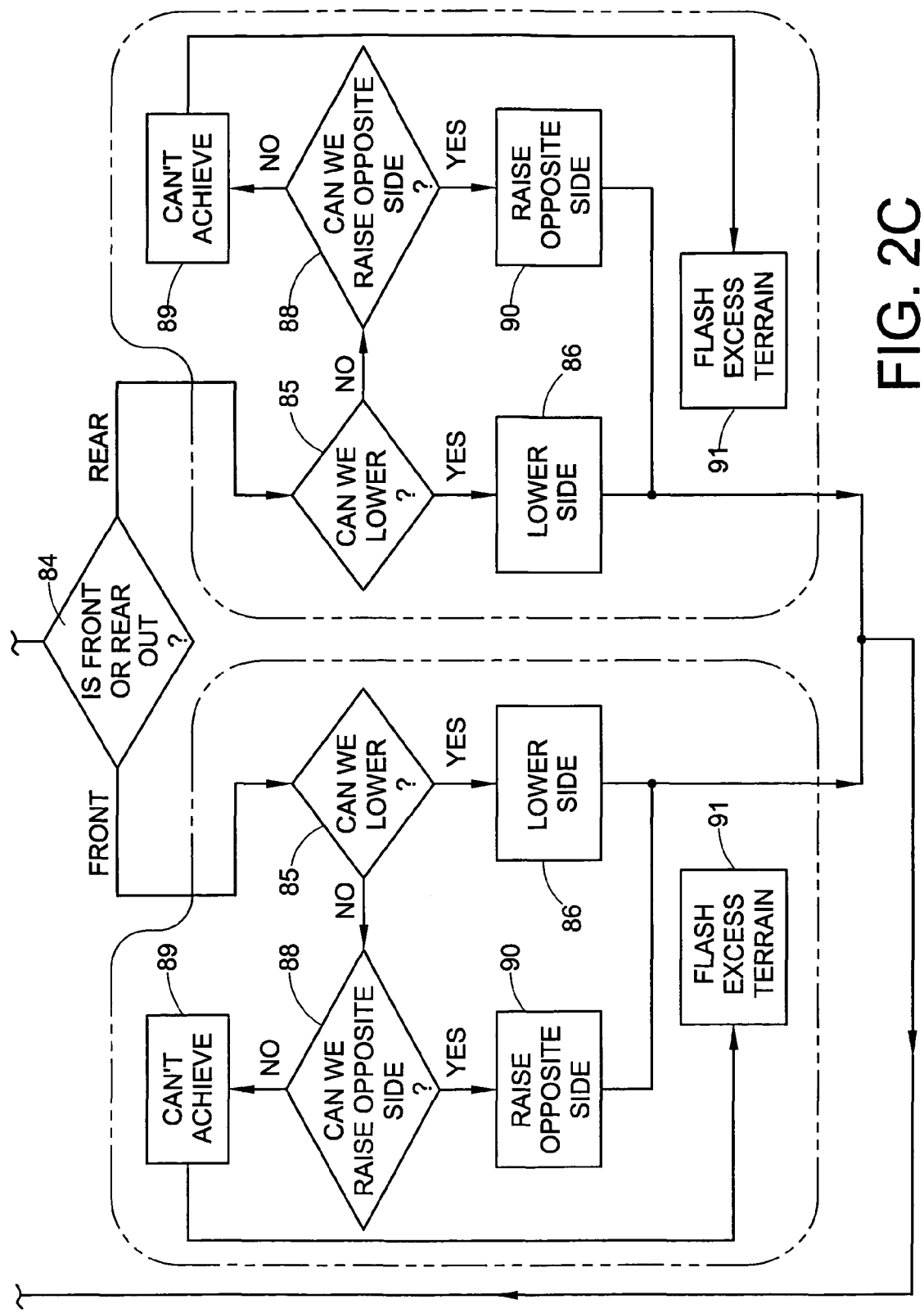
Figure 3C:
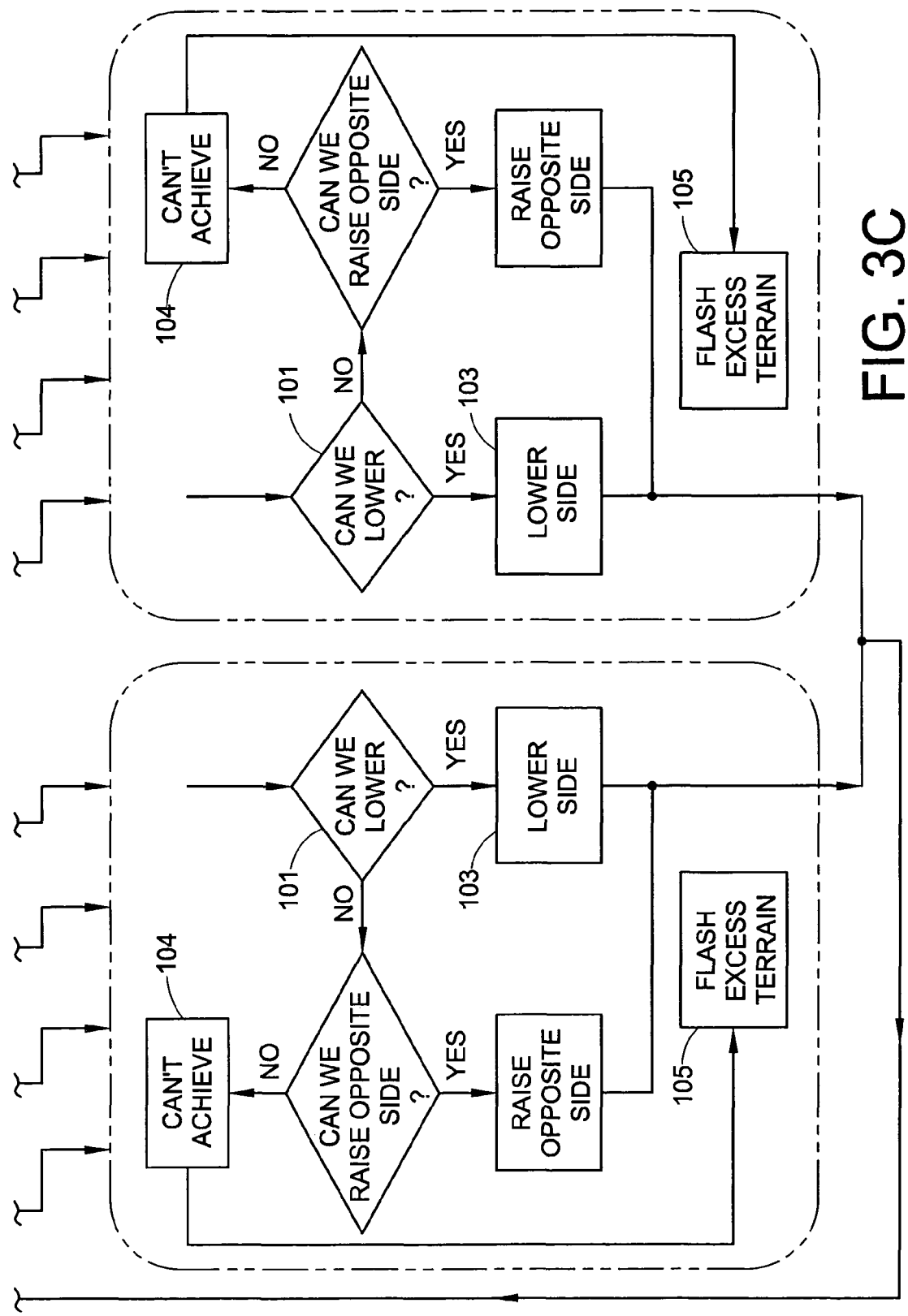
FIG. 3, which includes subfigures 3A, 3B, and 3C, is a flow diagram of a modified method for carrying out the alignment and leveled height changes of the vehicle chassis.

A modified embodiment of the improved method is shown in FIGS. 3A-3C. After a determination is made at block 79 that the magnitude of unlevelness is within the capability of the system, a determination is then made at block 100 as to what is the direction that is out of alignment, namely, as shown in FIG. 3B, whether it is the right front, left front, left rear, right rear, or entire front, the entire rear, the entire left side, or the entire right side of the vehicle chassis. After this determination is made by one of the blocks as shown in FIG. 3B, the system proceeds to the blocks of FIG. 3C which then determines at block 101 whether the location that is out of alignment can be sufficiently lowered and, if so, whether it would be the lower side as determined by block 102 or lower corner as determined by block 103. Again, if the out of alignment location cannot be effectively lowered, the system then determines, as shown by the alternate blocks in FIG. 3C, whether the opposite location, whether it be a side, end, or corner, can be raised to compensate for the misalignment. Again, light 74 will be flashed as shown by blocks 105 if aligning the misaligned area cannot be achieved, in a similar manner as discussed above for the embodiment of FIG. 2. After it has been determined that the desired alignment can be achieved by lowering a particular location on the vehicle chassis, the appropriate air spring is actuated through the appropriate control valve 28-31 for exhausting air from one or more of the air springs or, if necessary, to supply air to the appropriate air spring via the associated control valve to raise the unlevel corner, side, or end of the vehicle chassis.

After alignment with the pre-determined datum has been achieved, such as by lowering high corners of the vehicle (e.g., block 103), raising low corners of the vehicle (e.g., block "Raise Opposite Side" in FIG. 3C) or some combination thereof, for example, the system is returned to block 77. A YES determination is then reached at block 77, and an appropriate signal is sent to light 74 via block 78 (FIG. 3A) to indicate to the driver or operator that a leveled condition has been achieved. The system then proceeds to block 120 to record the initial height targets and enters the periodic wait state in block 122. Thereafter, the leveled height checking operation in blocks 124-130 can be performed, as discussed in detail above. Additionally, the leveled height adjustment operations in blocks 132-138 can also be performed, as discussed above.

The difference between the method of FIGS. 2 and 3 is that the method shown by the flow diagrams in FIG. 2 initially determine which side is out of alignment, after which it is determined whether it is the front or rear of that side that needs to be adjusted, whereas the method depicted by the flow diagram of FIG. 3 determines immediately which location of the vehicle chassis is out of alignment for subsequent correction.

Figure 4:
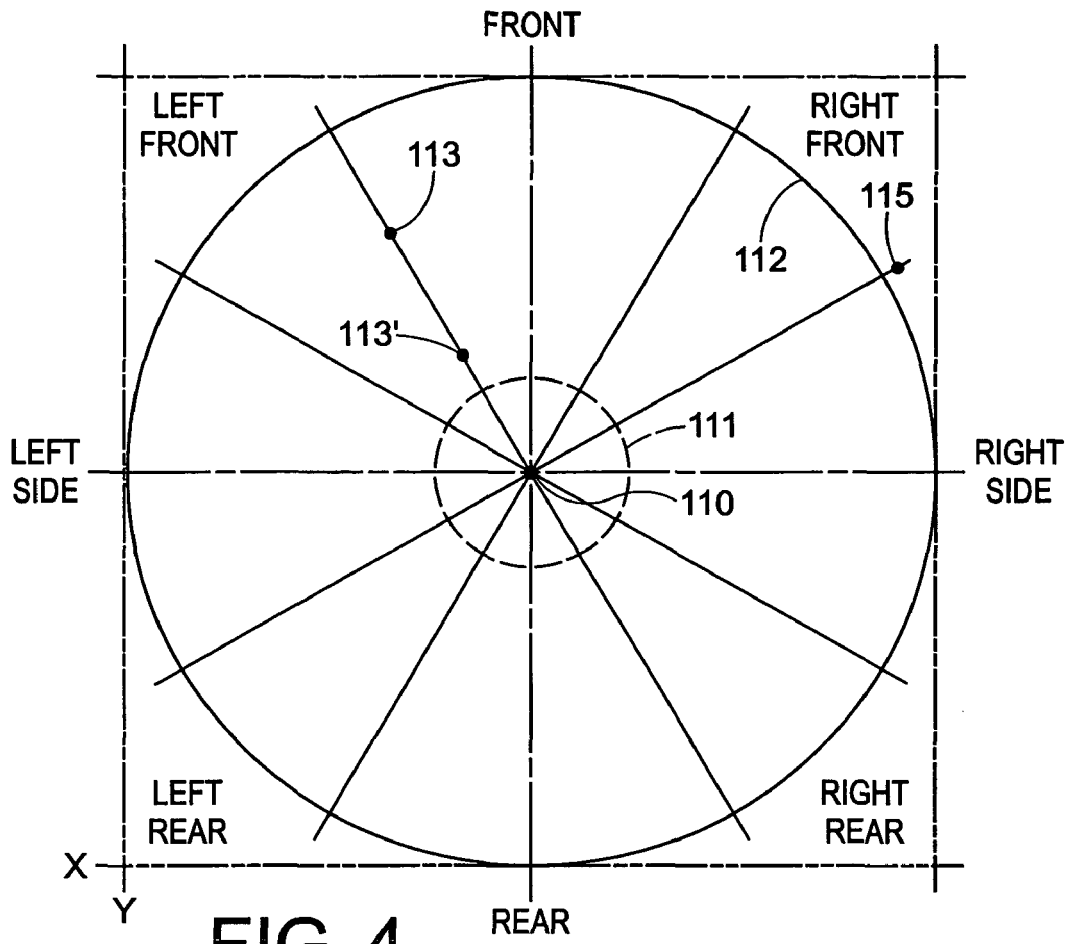
FIG. 4 is a diagrammatic representation of the manner in which the vehicle chassis is aligned by the methods shown by the flow diagrams of FIGS. 2 and 3.

FIG. 4 is another diagrammatic representation of how the system functions to achieve the alignment with respect to the analog or digital signal supplied by accelerometer 65. Center point 110 represents the exact alignment in both the X and Y axis determined by accelerometer 65. In this situation, the accelerometer will output signals corresponding to a midrange value or a value around the accelerometer's calibrated midpoint 110 from both the X and Y axis readings which indicates that both planes are level with the predetermined datum. The inner dot-dash circle 111 represents that position which, when reached, will indicate that the vehicle chassis or, alternatively, the floor or other part of the vehicle chassis being monitored, is substantially aligned with the predetermined datum. Outer concentric circle 112 represents the maximum unlevelness that can be compensated for by the vehicle and its suspension system.

In the particular example of FIG. 4, upon the output signal exceeding the value represented by circle 112, it will indicate that the misalignment or tilt is excessive and cannot be compensated for by the vehicle suspension system, such as represented by block 79 of FIG. 2A or other blocks 89, FIGS. 2B and 2C. As an example, assume that the two signals provided by accelerometer 65 intersect at point 113, which indicates that the front part and left side must be lowered until this point reaches inner circle 111. If the measured point falls within inner circle 111, no further alignment is required by the system. It will be appreciated that such a determination of excessive misalignment can be used in addition to or as an alternative to the end-of-travel analysis described above. However, should this point value fall outside of outer circle 112, such as shown by point 115, the system then indicates that too great a degree of misalignment exists and the capability of the suspension system to correct the misalignment is exceeded.

Under certain circumstances, it may be determined that the orientation of the chassis is or was within the capability of the suspension system to level but after one or more leveling operations a level condition cannot be achieved. These situations are represented by blocks 89 and 91 in FIGS. 2B and 2C, as well as blocks 104 and 105 in FIG. 3C. An example of such a situation might be where the operator has inadvertently parked the vehicle adjacent a foreign object that impedes the lowering of a portion of the chassis. In such a situation, the suspension system could have the capacity to fully level the vehicle, but the foreign object will only permit the chassis to be partially leveled. In FIG. 4, for example, the initial orientation of the chassis is indicated by the point 113 and the partially leveled condition is indicated by point 113'. Under such a circumstance, an indication, such as a flashing light or an audible signal, for example, can be output, such as from control panel 70, for example, to the operator of the vehicle to indicate that the vehicle has been partially leveled but remains outside of the fully leveled condition. Thus, the operator is given the option to reposition the vehicle for full leveling or accept the existing partially leveled condition.

Figure 10:
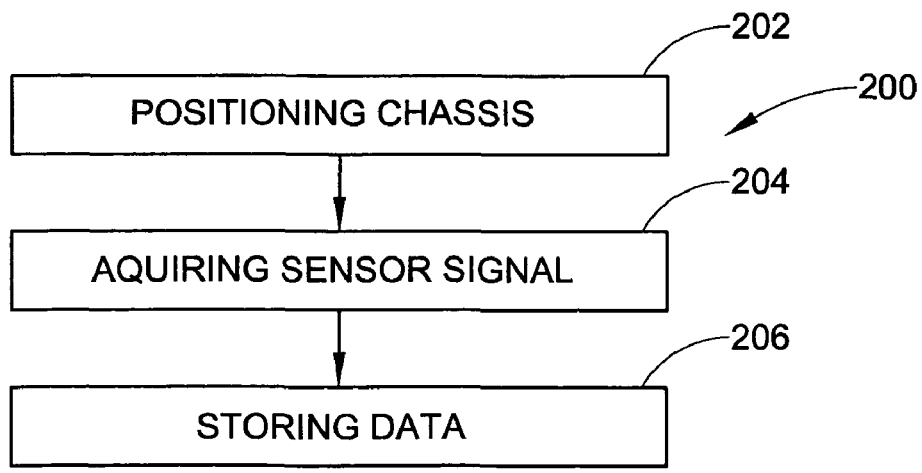
FIG. 10 is a flow diagram of one exemplary method of calibrating a sensor to a predetermined datum.

It is to be distinctly understood that the artificial horizon or predetermined datum referred to herein is not in any way limited to a horizontal or substantially horizontal plane. Rather the predetermined datum can be a plane aligned in any desired orientation relative to the X-axis, Y-axis or any combination thereof without departing from the principles of the present invention. One method 200 of calibrating the predetermined datum is illustrated in FIG. 10, and includes physically positioning the vehicle chassis in the desired orientation, such as where the floor of the chassis is substantially horizontal or tilting from back to front with the front being substantially lower than the back, for example, as indicated in block 202. Once the vehicle chassis is physically oriented, a signal indicating the orientation is acquired from the alignment sensor, as indicated in block 204, and the data associated with the signal is stored in the ECU as alignment data, as indicated in block 206. Thereafter, the system operates as discussed above and repeatedly compares the signals output from the alignment sensor to the alignment data in the ECU.

Thus, the improved system and method of the present invention enables a vehicle chassis and, in particular, the floor or other wall of an RV, trailer or other structure, to be aligned easily and efficiently as well as raised and lowered in the leveled horizon condition by utilizing the existing air suspension ride system of the vehicle, by the addition of accelerometer 65 or other type of alignment sensor in combination with ECU 42, which has been programmed according to the flow diagrams shown in the drawing figures. ECU 42 interprets the return values from the X and plane readings provided by accelerometer 65 and makes height adjustments to the vehicle via the height control componentry and, in particular, the ride suspension air springs, in order to get the vehicle chassis aligned with the predetermined datum, irrespective of the orientation of the ground, wheels or axles of the vehicle. The system preferably uses the existing ECU unit which is used for the normal ride suspension system and leveling with various modifications thereto in order to achieve the flow diagram and the results shown in the drawing figures.

The control system of the present invention also is provided with suitable interlocks that act to selectively deactivate at least a portion of the horizon leveling system and returns the system to the normal ride height leveling upon actuation of switches 45 and/or 49. Immediately upon any of these switches being actuated, the ECU preferably automatically disengages the automatic leveling system of the present invention. Also, speedometer 59 and/or another suitable movement-sensing component is preferably connected with ECU 42, such as through line 60, for example, to further signal ECU 42 to selectively deactivate the horizon leveling system upon the vehicle being put into motion. Thus, where the speedometer or other device output a signal indicative of a speed greater than about zero (0) mph, one of the alignment sensor and at least a portion of the ECU can be deactivated. Also, leaving "Park" or releasing the emergency brake could optionally signal ECU 42 to disengage the leveling system. As discussed above, the system initially attempts to adjust the height of the vehicle by exhausting air from the high side or end air springs to conserve the stored pressurized fluid in the reservoir 22. However, if necessary, air can be supplied to the appropriate air springs from reservoir 22 through the appropriate individual control valves 28-31 to raise that portion of the vehicle body to compensate for any misalignment if necessary and/or if desired.

It is readily understood that air suspension ride systems, other than that shown in FIG. 1, could be utilized without affecting the concept of the invention, since one of the main features is the setting of the artificial horizon level and the adjusting of the appropriate air spring/springs to achieve this position, which is determined through an alignment sensor or level detection device, such as accelerometer 66, for example. Again, other types of level detecting devices could be utilized without affecting the concept of the invention. Likewise, the present system can be used on stationary equipment other than vehicles, and the air springs replaced with hydraulic pressure members, etc., without effecting the invention.

While the invention has been described with reference to the foregoing embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims.

The invention claimed is:

1. A method of adjusting a leveled height of a vehicle that has a sprung mass supported by a suspension system on an unsprung mass, the suspension system is selectively adjustable using a control system that is operable in a standard leveling mode in which the sprung mass is leveled relative to the unsprung mass and a horizon leveling mode in which the sprung mass is leveled relative to a predetermined datum independent of the relative position of the unsprung mass, said method comprising:
   a) entering said horizon leveling mode;
   b) approximately aligning the sprung mass with said predetermined datum at a first leveled height while in said horizon leveling mode;
   c) receiving an operator input corresponding to one of increasing said first leveled height and decreasing said first leveled height while in said horizon leveling mode; and,
   d) adjusting the sprung mass from said first leveled height to a second leveled height based on said operator input while in said horizon leveling mode.

2. A method according to claim 1 further comprising generating first height target data corresponding to said first leveled height.

3. A method according to claim 2 further comprising modifying said first height target data based on said operator input and generating second height target data therefrom that corresponds to a second leveled height.

4. A method according to claim 3 further comprising determining a current leveled height of the sprung mass and comparing said current leveled height to said second height target data;
   upon determining that said current leveled height is approximately aligned with said second leveled height, waiting a predetermined duration;
   upon determining that said current leveled height is not approximately aligned with said second leveled height, adjusting the sprung mass in d).

5. A method according to claim 1, wherein d) includes incrementally adjusting the suspension system to maintain the sprung mass in approximate alignment with said predetermined datum.

6. A method of adjusting a suspension system of a vehicle that has a sprung mass and an unsprung mass, said method comprising:

a) entering an operating mode in which a control system of the suspension system is capable of approximately aligning the sprung mass of a vehicle with a predetermined datum;

b) adjusting the sprung mass into an approximately aligned condition with said predetermined datum using the suspension system, said approximately aligned condition occurring at a first leveled height;

c) checking for approximate alignment of the sprung mass with said predetermined datum;

d) generating and storing initial height target data corresponding to said first leveled height of the sprung mass;

e) receiving an operator input corresponding to a desired change in said first leveled height of the sprung mass;

f) modifying said initial height target data based at least in part on said operator input;

g) checking for approximate positioning of the sprung mass at a second leveled height that corresponds to said height target data modified in f);

h) determining that the sprung mass is at a leveled height that is different from said second leveled height which corresponds to said height target data modified in f); and, i) adjusting the sprung mass into approximate position at said second leveled height using said suspension system while maintaining the sprung mass in approximate alignment with said predetermined datum.

7. A method according to claim 6 further comprising waiting a predetermined duration and checking for approximate position of the sprung mass at said second leveled height.

8. A method according to claim 7, wherein waiting said predetermined duration includes waiting for a period of from about 30 minutes to about 120 minutes.

9. A method according to claim 6 further comprising determining an end of travel of the suspension system and determining whether said height target data modified in f) is capable of being achieved by the suspension system.

10. A method according to claim 9 further comprising indicating to an operator that the suspension system is incapable of achieving the second leveled height upon determining that said height target data modified in f) exceeds the capability of the suspension system.

11. A method according to claim 6 further comprising receiving an input signal corresponding to one of raising and lowering the sprung mass as said operator input, and assigning said input signal a discrete value corresponding to a predetermined distance, and f) include modifying said initial height target data by said predetermined distance.

12. A method according to claim 6 further comprising receiving as said operator input an input value corresponding to a distance to one of raise and lower the sprung mass, f) includes modifying said initial height target data by said input value, and i) includes incrementally adjusting the sprung mass to reach the approximate position of said second leveled height.

13. A vehicle suspension system operatively disposed between an associated sprung mass and an associated unsprung mass of an associated vehicle and adapted to approximately align the associated sprung mass with a predetermined datum and to adjust a leveled height of the associated sprung mass relative to a ground surface while maintaining the associated sprung mass in approximate alignment with said predetermined datum, said vehicle suspension system comprising:

a plurality of fluid suspension members supported between the associated sprung and unsprung masses;

a pressurized fluid source in fluid communication with said plurality of fluid suspension members;

a control device fluidically disposed between said pressurized fluid source and said plurality of fluid suspension members and operative to selectively transfer pressurized fluid therebetween;

an alignment sensor supported on the associated sprung mass and operative to output a signal indicative of an orientation of the associated sprung mass;

a height sensor operatively connected between the associated sprung and unsprung masses and operative to output a signal indicative of a distance therebetween; and, a control system in communication with at least said control device, said alignment sensor and said height sensor, said control system including a memory and a determining device, and said control system adapted to operate said vehicle suspension system in a standard leveling mode during over-the-road usage of the associated vehicle and in a horizon leveling mode during stationary usage of the associated vehicle, said control system operative to:

receive a signal from said alignment sensor and selectively activate said control device until said signal from said alignment sensor is indicative of the associated sprung mass being approximately aligned with said predetermined datum;

receive said signal from said height sensor and store in said memory height target data having a relation to said signal as a target height;

receive an operator input and modify said height target data based on said operator input; and, adjust said leveled height of the associated sprung mass based on said modified height target data.

14. A vehicle suspension system according to claim 13, wherein said control system is adapted to periodically compare said signal from said height sensor with said target height to check a leveled height of the associated sprung mass.

15. A vehicle suspension system according to claim 14, wherein said control system includes a timer and is adapted to check said leveled height of the associated sprung mass relative to said height target after a predetermined duration.

16. A vehicle suspension system according to claim 13, wherein said control system includes an operator interface capable of receiving operator inputs and outputting signals corresponding to said operator inputs.

17. A vehicle suspension system according to claim 16, wherein said operator interface is adapted to communicate to an associated operator that said control system is adjusting said leveled height of the associated sprung mass.

18. A vehicle suspension system according to claim 13, wherein said control system is adapted to determine using said determining device whether adjusting said target height according to said modified height target data is within a capability of said plurality of fluid suspension members.

19. A vehicle suspension system according to claim 18, wherein said control system includes end-of-travel data stored in said memory and is adapted to compare said modified height target data with said end-of-travel data.

* * * * *